United States Patent
Lim

(10) Patent No.: US 7,830,453 B2
(45) Date of Patent: Nov. 9, 2010

(54) METHOD OF CONVERTING DIGITAL BROADCAST CONTENTS AND DIGITAL BROADCAST TERMINAL HAVING FUNCTION OF THE SAME

(75) Inventor: Byung Chun Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 1156 days.

(21) Appl. No.: 11/422,535

(22) Filed: Jun. 6, 2006

(65) Prior Publication Data

US 2006/0274201 A1 Dec. 7, 2006

(30) Foreign Application Priority Data

Jun. 7, 2005 (KR) .................. 10-2005-0048460

(51) Int. Cl.
*H04N 9/475* (2006.01)
*H04N 5/60* (2006.01)

(52) U.S. Cl. ...................... 348/515; 348/738

(58) Field of Classification Search ............... 348/738, 348/480, 515; 725/32, 34, 25, 28; 715/201–203; 375/240.26; 704/278, 246; 381/110, 306; 379/88.13; 455/414.1, 414.4, 426.1, 556.1
See application file for complete search history.

(56) References Cited

U.S. PATENT DOCUMENTS

| | | | | |
|---|---|---|---|---|
| 5,289,288 A * | 2/1994 | Silverman et al. | ............. | 386/97 |
| 5,512,954 A * | 4/1996 | Shintani | .................. | 348/468 |
| 5,585,858 A * | 12/1996 | Harper et al. | ............... | 348/485 |
| 5,892,536 A * | 4/1999 | Logan et al. | .................. | 725/34 |
| 6,067,126 A * | 5/2000 | Alexander | .................. | 348/738 |
| 6,321,158 B1 * | 11/2001 | DeLorme et al. | ............. | 701/201 |
| 6,744,974 B2 * | 6/2004 | Neuman | ....................... | 386/96 |
| 6,829,018 B2 * | 12/2004 | Lin et al. | .................... | 348/738 |
| 7,027,124 B2 * | 4/2006 | Foote et al. | .................... | 352/1 |
| 7,055,166 B1 * | 5/2006 | Logan et al. | .................. | 725/32 |
| 7,457,515 B1 * | 11/2008 | Faria | ........................... | 386/52 |
| 7,693,484 B2 * | 4/2010 | Ting et al. | .................. | 455/41.2 |
| 2002/0147782 A1 * | 10/2002 | Dimitrova et al. | ........... | 709/207 |
| 2006/0008256 A1 * | 1/2006 | Khedouri et al. | ............ | 386/124 |
| 2006/0285654 A1 * | 12/2006 | Nesvadba et al. | .......... | 379/67.1 |

FOREIGN PATENT DOCUMENTS

KR          1020040036159 A          4/2004

* cited by examiner

*Primary Examiner*—Victor Kostak
(74) *Attorney, Agent, or Firm*—Lee, Hong, Degerman, Kang & Waimey

(57) ABSTRACT

A method of converting digital broadcast contents and digital broadcast terminal having a function of the same are disclosed, by which music in compliance with a user's taste can be inserted as a background music by separating an audio signal of digital broadcast contents and by which a text can be displayed as a caption on a screen of the terminal in a manner of converting a voice recognized from a separated audio signal to the text. In converting digital broadcast contents including a video signal and an audio signal received via a digital broadcast network in a digital broadcast terminal, the present invention includes a step (a) of extracting the audio signal and the video signal for a specific section of the digital broadcast contents and a step (b) of synthesizing the extracted video signal with prescribed audio data.

18 Claims, 6 Drawing Sheets

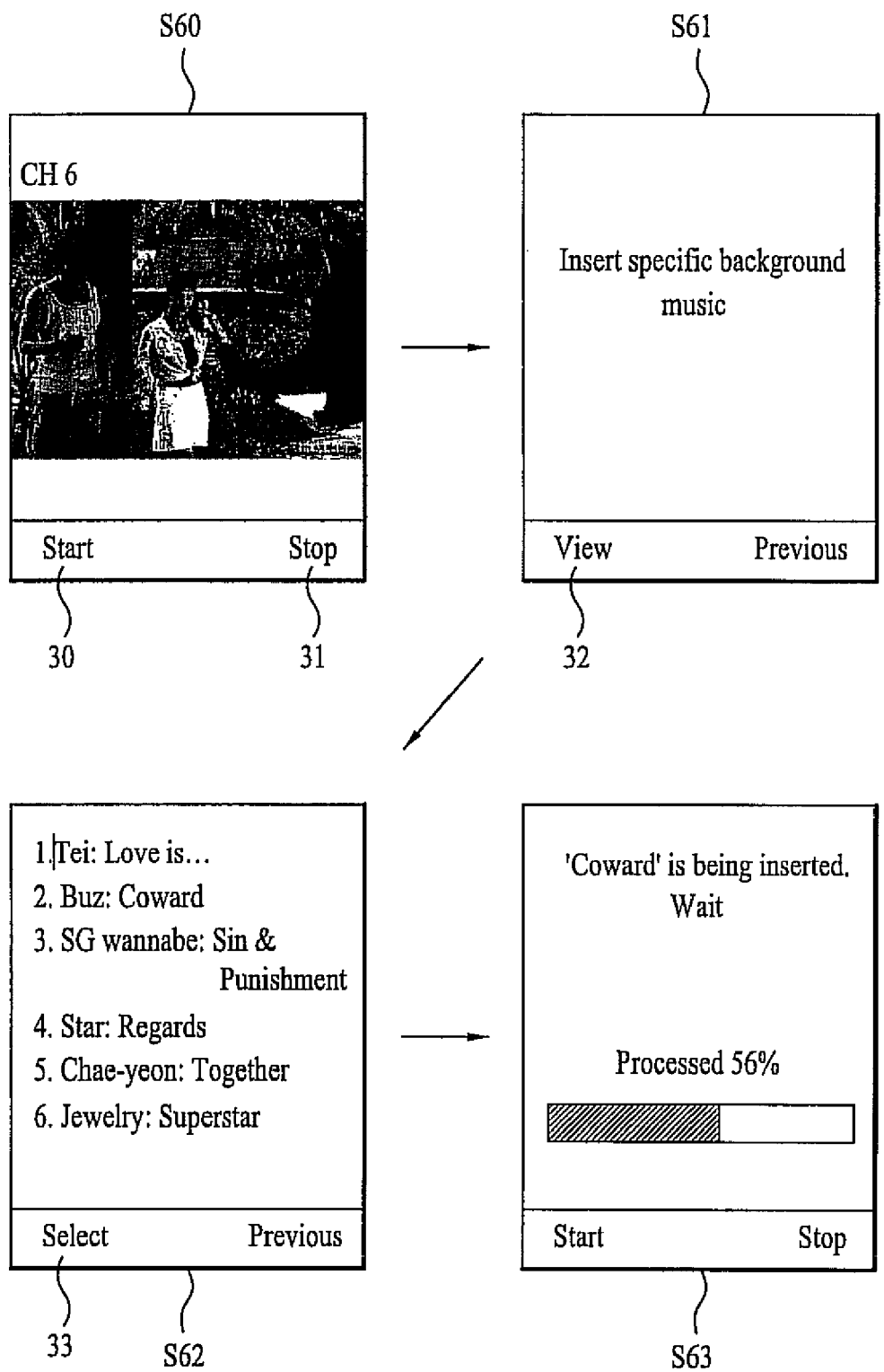

METHOD OF CONVERTING DIGITAL BROADCAST CONTENTS AND DIGITAL BROADCAST TERMINAL HAVING FUNCTION OF THE SAME

CROSS-REFERENCE TO RELATED APPLICATION

This application claims the benefit of the Korean Patent Application No. 10-2005-0048460, filed on Jun. 7, 2005, which is hereby incorporated by reference as if fully set forth herein.

BACKGROUND OF THE INVENTION

1. Field of the Invention

The present invention relates to a digital broadcast and terminal capable of receiving the same, and more particularly, to a method of converting digital broadcast contents and digital broadcast terminal having a function of the same. Although the present invention is suitable for a wide scope of applications, it is particularly suitable for converting digital broadcast contents in compliance with a user's taste in a manner of inserting a background music into digital broadcast contents and the like.

2. Discussion of the Related Art

Recently, the convergence and development of communication and broadcasting technologies bring the age of digital broadcasting that enables a user to view a digital broadcast at a specific time or to enjoy mobile digital broadcasts, let alone a fixed place or time.

Specifically, in Korea, S-DMB (satellite-digital multimedia broadcasting) has launched since May 2005. And, it is also expected that various kinds of digital broadcasts will be globally serviced. Digital broadcasting specifications have been proposed, discussed and adopted for a mobile receiver as well as a fixed type receiver. This tendency enables a user to receive digital broadcast contents including various multimedia free from places and broadcast schedules.

Digital broadcasting enables broadcast services of various multimedia contents including education, drama, news, sports, game, music, movie, etc. So, it is expected that the user's demand for selectively receiving these multimedia contents suitable for the user's taste, reproducing various contents by editing the received contents and transferring the reproduced contents to a third party will rise.

Moreover, a digital broadcast terminal, and more particularly, a portable or mobile digital broadcast terminal can be implemented into various types. For instance, a digital broadcast dedicated terminal for receiving digital broadcasts only, a digital broadcast terminal having a combined type of a mobile communication terminal and a mobile phone, a digital broadcast terminal combined with a navigation function and the like have been developed and marketed.

However, the above-explained digital broadcast terminal needs a function of editing various multimedia contents received from a digital broadcasting center in various ways to be suitable for a user's taste.

SUMMARY OF THE INVENTION

Accordingly, the present invention is directed to a method of converting digital broadcast contents and digital broadcast terminal having a function of the same that substantially obviate one or more problems due to limitations and disadvantages of the related art.

An object of the present invention is to provide a method of converting digital broadcast contents and digital broadcast terminal having a function of the same, by which music in compliance with a user's taste can be inserted as a background music by separating an audio signal of digital broadcast contents.

Another object of the present invention is to provide a method of converting digital broadcast contents and digital broadcast terminal having a function of the same, by which a text can be displayed as a caption on a screen of the terminal in a manner of converting a voice recognized from a separated audio signal to the text.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in converting digital broadcast contents including a video signal and an audio signal received via a digital broadcast network in a digital broadcast terminal, a method of converting the digital broadcast contents according to the present invention includes a step (a) of extracting the audio signal and the video signal for a specific section of the digital broadcast contents and a step (b) of synthesizing the extracted video signal with prescribed audio data.

Preferably, the method further includes a step (c) of extracting a voice signal from the extracted audio signal, a step (d) of converting the extracted voice signal to a text, and a step (e) of synchronizing data synthesized in the step (b) and the text together.

In another aspect of the present invention, in converting digital broadcast contents including a video signal and an audio signal received via a digital broadcast network in a digital broadcast terminal, a method of converting the digital broadcast contents includes a step (a) of selecting a specific section of the digital broadcast contents, a step (b) of separating the selected section into the video signal and the audio signal, a step (c) of selecting at least one of at least one or more audio data stored in a memory provided to the terminal, and a step (d) of synthesizing the separated video signal and the selected at least one audio data together.

Preferably, the method further includes a step (e) of extracting a voice signal from the audio signal extracted in the step (b), a step (f) of converting the extracted voice signal to a text, and a step (g) of synchronizing data synthesized in the step (d) and the text together.

More preferably, in the step (e), the voice signal is extracted together with time information. And, the time information is used for the synchronizing step (g).

Preferably, the method further includes a step (h) of storing data synchronized in the step (g).

In another aspect of the present invention, a digital broadcast terminal includes a digital broadcast receiving unit receiving a digital broadcast signal, a memory unit storing at least one audio data, and a control unit separating a specific section of digital broadcast contents received via the digital broadcast receiving unit into a video signal and an audio signal, the control unit synthesizing the video signal and at least one of the at least one audio data stored in the memory unit together.

Preferably, the control unit extracts a voice signal from the separated audio signal, converts the extracted voice signal to a text and synchronizes the synthesized data and the text together.

Preferably, the control unit stores the synchronized data in the memory unit.

In another aspect of the present invention, a digital broadcast terminal includes a digital broadcast receiving unit receiving a digital broadcast signal, a memory unit storing digital broadcast contents received via the digital broadcast receiving unit and at least one or more audio data, an input unit receiving a selection signal for a specific section of the digital broadcast contents and a selection signal for at least one of the at least one or more audio data, and a processor having an A/V separating module and an A/V synthesizing module, the A/V separating module separating the selected section into a video signal and an audio signal to output, the A/V synthesizing unit synthesizing the separated video signal and the selected audio data to output.

Preferably, the processor further includes a voice recognizing module extracting a voice signal from the separated audio signal and the voice recognizing module converts the extracted voice signal to a text to output.

More preferably, the processor further includes a synchronizing module synchronizing the synthesized data outputted from the A/V synthesizing module and the text outputted from the voice recognizing module together.

Preferably, the processor further includes an audio editing module extracting a specific data section for a specific one of the at least one or more audio data. And, the audio editing module delivers the extracted data section to the A/V synthesizing module.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 6 is a diagram of a screen for synthesizing a video signal and audio data of digital broadcast contents together according to the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

First of all, digital broadcasting, to which the present invention is applicable, includes European DAB (digital audio broadcasting) or DVB-H (digital video broadcasting-handheld) based on Eureka-147, Media FLO (forward link only) lead by Qualcomm, U.S.A., Korean DMB (digital multimedia broadcasting), Japanese ISDB-T (integrated service digital broadcasting-terrestrial), etc. The Korean DMB can be classified into T-DMB (terrestrial-digital multimedia broadcasting) based on Eureka-147 and S-DMB (satellite-digital multimedia broadcasting) using satellite communications. Detailed specifications of the respective digital broadcasting will be omitted in the following description.

Meanwhile, mobile digital broadcasting has been taken as an example in the aforesaid explanation. Yet, digital broadcasting to which the present invention is applicable is not limited to this. In other words, the present invention is applicable to the following fixed type digital broadcasting as well. As a fixed type digital broadcasting specification, there is 8-VSB of U.S. digital broadcasting specification developed by Zenith, European DVB-T (digital video broadcasting-terrestrial) or the like. Namely, the present invention is applicable to both mobile digital broadcasting and fixed type digital broadcasting.

Figure 1:
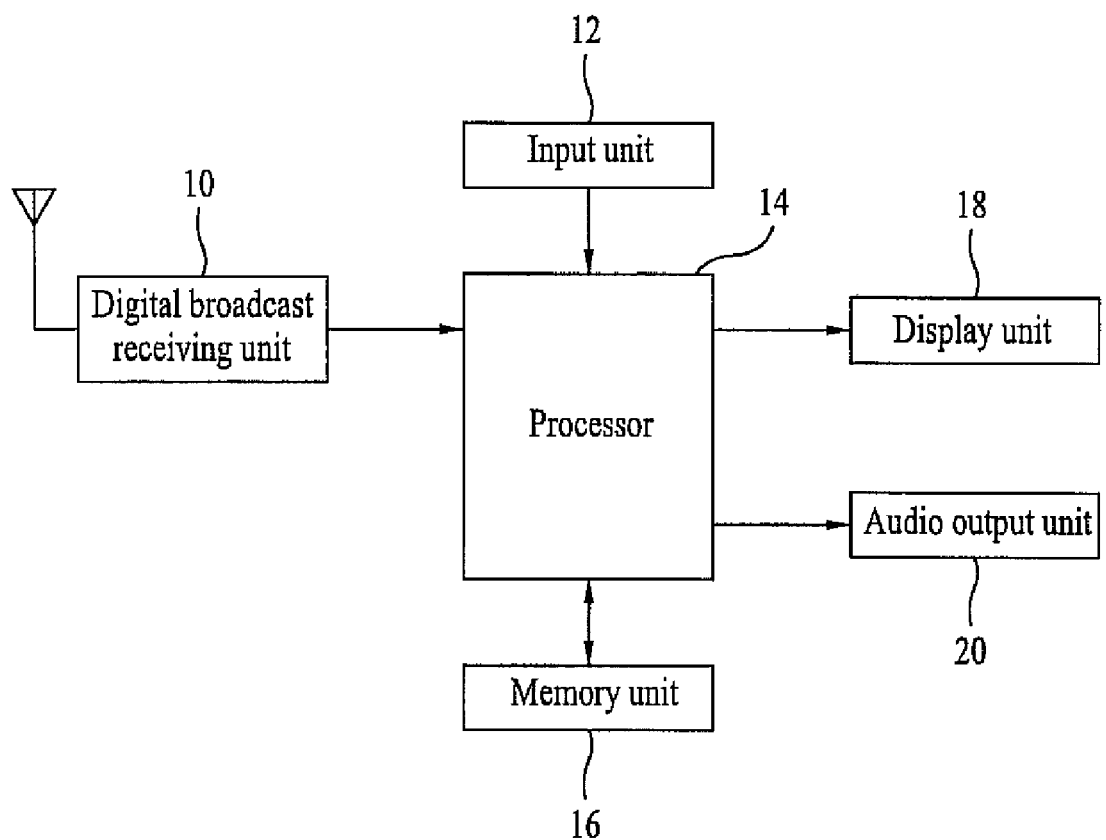
FIG. 1 is a block diagram of a digital broadcast terminal having a digital broadcast contents converting function according to one embodiment of the present invention.
Figure 2:
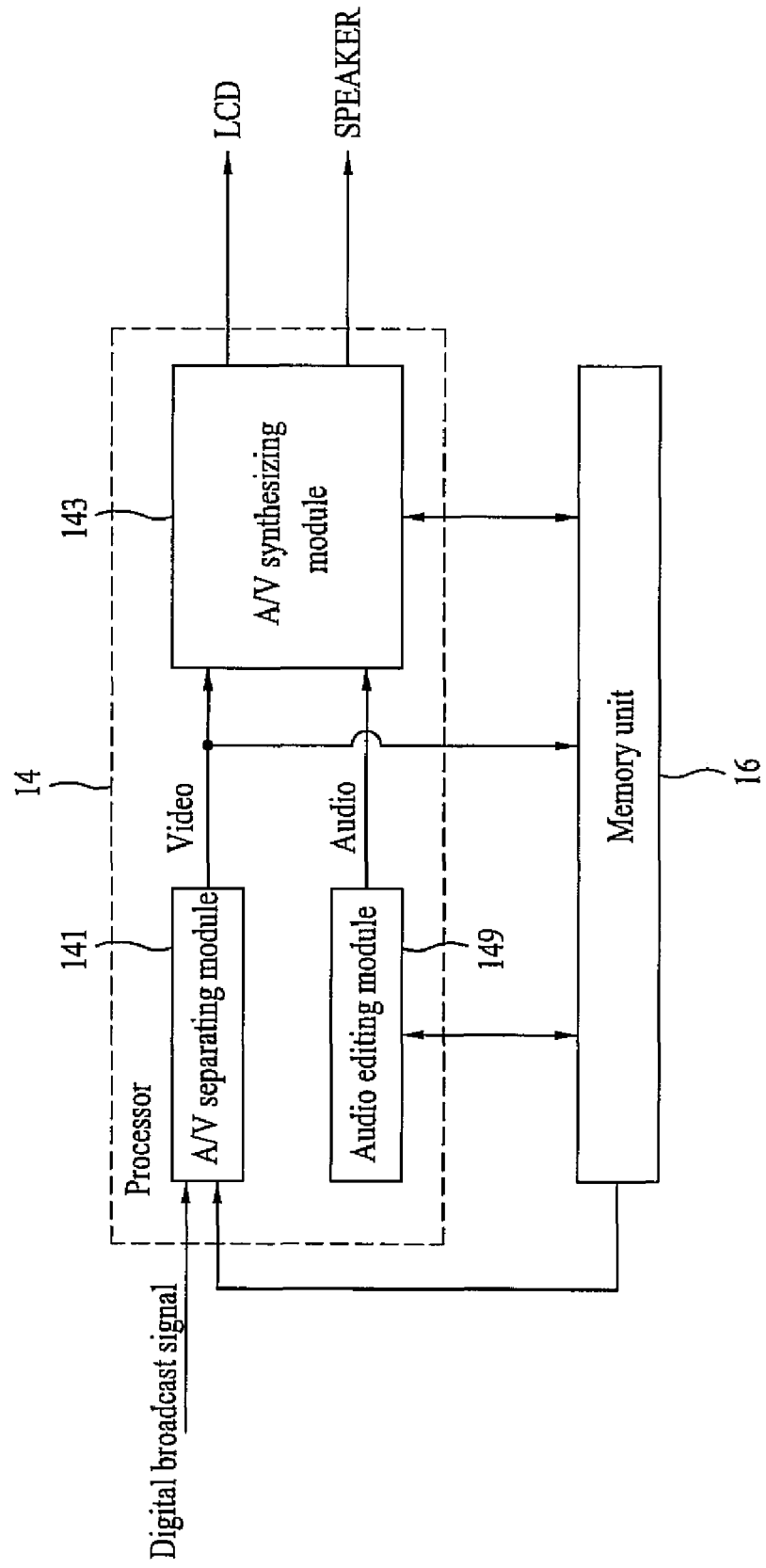
FIG. 2 and FIG. 3 are detailed block diagrams of a processor of the terminal shown in FIG. 1.
Figure 3:
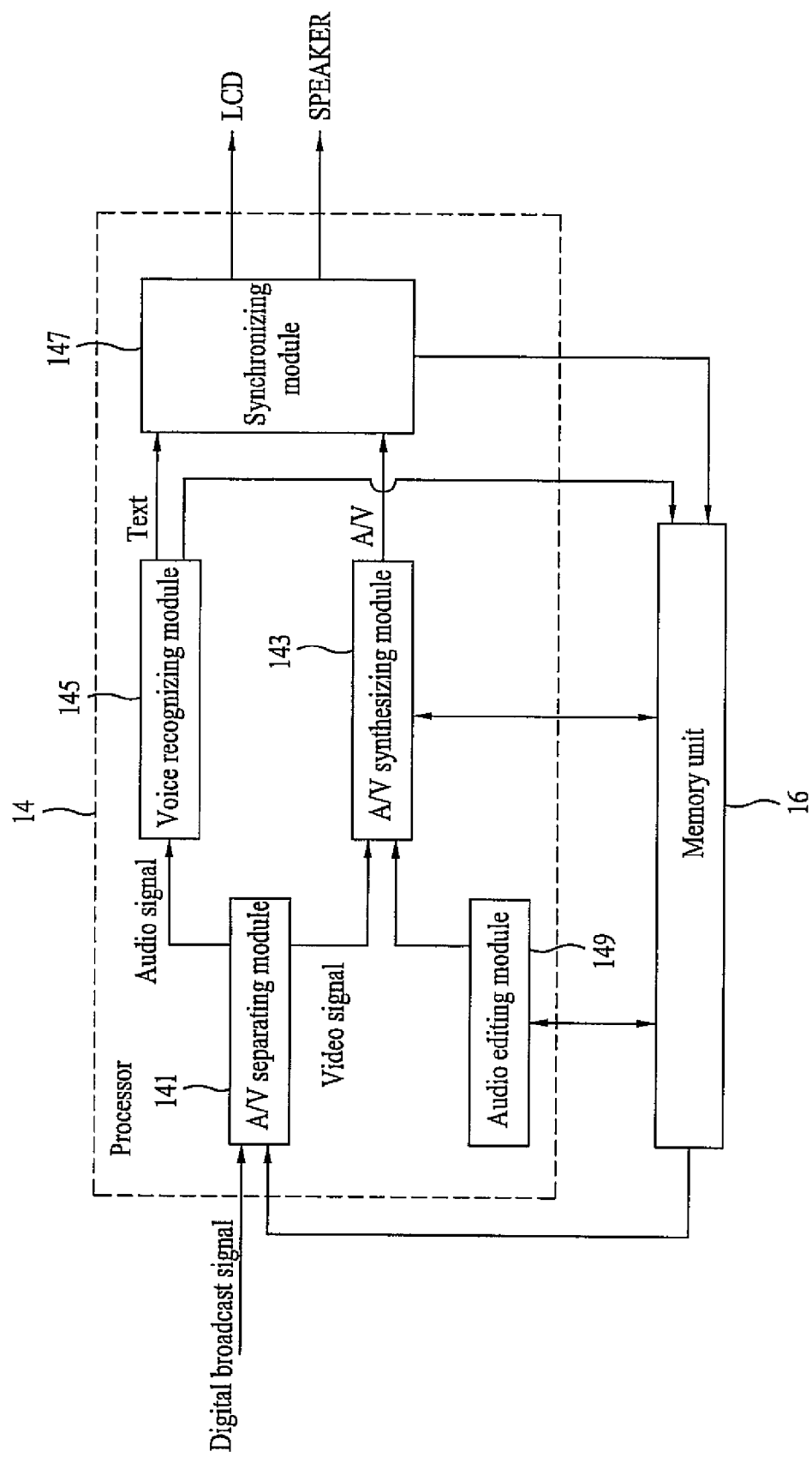

FIG. 1 is a block diagram of a digital broadcast terminal having a digital broadcast contents converting function according to one embodiment of the present invention, and FIG. 2 and FIG. 3 are detailed block diagrams of a processor of the terminal shown in FIG. 1.

A digital broadcast terminal having a digital broadcast contents converting function according to one embodiment of the present invention is explained in detail with reference to FIGS. 1 to 3 as follows.

Referring to FIGS. 1 to 3, a digital broadcast terminal according to one embodiment of the present invention includes a digital broadcast receiving unit 10, an input unit 12, a processor 14, a memory unit 16, a display unit 18 and an audio output unit 20.

The digital broadcast receiving unit 10 is a device that receives a digital broadcast signal from a digital broadcasting network. And, the digital broadcast receiving unit 10 transfers the received digital broadcast signal to the processor 14.

The input unit 12 is a device that receives information or various commands from a user. And, the input unit 12 includes a keypad having various keys or a touch screen.

The memory unit 16 is loaded with a prescribed program that controls an overall operation of the digital broadcast terminal according to the present invention. And, the memory unit 16 stores data inputted/outputted when the overall operation of the digital broadcast terminal is executed by the processor 14. And, the memory unit 16 stores various processed data. Moreover, the memory unit 16 stores at least one audio data.

The display unit 16 is a device that displays a status of the digital broadcast terminal or various kinds of information.

And, the audio output unit 20 is a device that outputs audio signals.

The processor 14 collectively manages the overall operation of the digital broadcast terminal according to the present invention and controls the digital broadcast receiving unit 10, the input unit 12, the memory unit 16, the display unit 18 and the audio output unit 20.

The digital broadcast terminal having the digital broadcast contents converting function according to the present invention is explained with reference to an operation of the processor 14 as follows.

First of all, the processor 14, as shown in FIG. 2 and FIG. 3, includes an A/V (audio/video) separating module 141, an A/V synthesizing module 143 and an audio editing module 149. And, the processor 14, a shown in FIG. 3, can further include a voice recognizing module 145 and a synchronizing module 147.

The input unit 12 receives a selection signal for a specific digital broadcast content from a user. The digital broadcast content corresponds to a real-time digital broadcast received via the digital broadcast receiving unit 10 or a signal broadcast signal stored in the memory unit 16 via the digital broadcast receiving unit 10. And, the input unit receives a selection signal for a specific section of the selected digital broadcast content and a selection signal for at least one of the at least one audio data stored in the memory unit 16.

The A/V separating module 141 separates the selected section from the selected digital broadcast content into a video signal and an audio signal and then outputs the video and audio signals. The video signal is delivered to the A/V synthesizing module 143 or is stored in the memory unit 16. And, the audio signal is delivered to the voice recognizing module 145 or is stored in the memory unit 16.

The A/V synthesizing module 143 synthesizes the video signal outputted from the A/V separating module 141 and the audio signal selected through the input unit 12 together and then outputs the synthesized signal.

Meanwhile, a play time of the selected section of the selected digital broadcast content may differ from that of the selected audio data. So, it is necessary to extract data amounting to the play time of the selected section of the digital broadcast content from the selected audio data. The audio editing module 149 extracts a data section for one of the at least one audio data stored in the memory unit 16 and then delivers the extracted data section to the A/V synthesizing module 143. The data section extracting operation of the audio editing module 149 can be performed automatically (auto mode) or manually (manual mode). According to the auto mode, the audio editing module 149 automatically extracts a data section corresponding to a play time of a selected section of the digital broadcast content and then delivers the extracted data section to the A/V synthesizing module 143. According to the manual mode, the audio editing module 149 receives a selection signal for a section of the selected audio data from the input unit 12, extracts audio data amounting to the selected section and then delivers the extracted audio data to the A/V synthesizing module 143.

The data synthesized by the A/V synthesizing unit 143 is outputted via the display unit 18 and the audio output unit 20. The synthesized data can be stored in the memory unit 16.

Meanwhile, the audio signal separated by the A/V separating module 141 can include a human voice signal. So, a new digital content generated by the A/V separating module 141 and the A/V synthesizing module 143 excludes an audio signal included in the original digital broadcast content. The excluded audio signal can be restored into a text format via the voice recognizing module 145 and the synchronizing module 147.

The voice recognizing module 145 extracts a voice signal from the audio signal outputted from the A/V separating module 141, converts the extracted voice signal to a text and then outputs the text. In particular, in case that the selected digital broadcast content corresponds to a drama or movie, dialogs of actors/actresses are extracted by the voice recognizing module 145 and are then converted to a text to be used as a caption. The caption function can be turned of according to a user's selection.

The synchronizing module 147 synchronizes the text delivered from the voice recognizing module 145 with the synthesized data delivered from the A/V synthesizing module 143. The data synchronized by the synchronizing module 147 is outputted via the display unit 18 and the audio output unit 20.

Meanwhile, in case of attempting to convert a received real-time digital broadcast content by the present invention, a time shift function can be employed.

The time shift function is to repeat a process for storing a predetermined quantity of a received digital broadcast in a memory and a process for replacing the digital broadcast stored in the memory by a predetermined quantity of a digital broadcast that is continuously received in receiving the digital broadcast by real time.

For instance, the processor 14 receives a command signal for initiating a digital broadcast conversion according to the present invention for a specific digital broadcast that is being received by real time. The processor 14 stores a predetermined quantity (hereinafter named 'first section') from a point corresponding to a timing point of receiving the command signal for the digital broadcast that is being received in the memory unit 16. The processor 14 converts the stored first section and then stores it in the memory unit 16. The processor 14 stores a second section temporally continuous from the first section in the memory unit 16 and deletes the first section, of which conversion is terminated, from the memory unit 16. And, the processor 14 keeps repeating the above-explained operation until receiving a command signal for ending the conversion of the digital broadcast content according to the present invention from the input unit 12.

A method of converting digital broadcast contents according to the present invention can be implemented by a digital broadcast terminal including a digital broadcast receiving module capable of receiving digital broadcast signals via a digital broadcast network, For instance, a method of converting digital broadcast contents according to the present invention can be implemented using the digital broadcast terminal shown in FIGS. 1 to 3.

Figure 4:
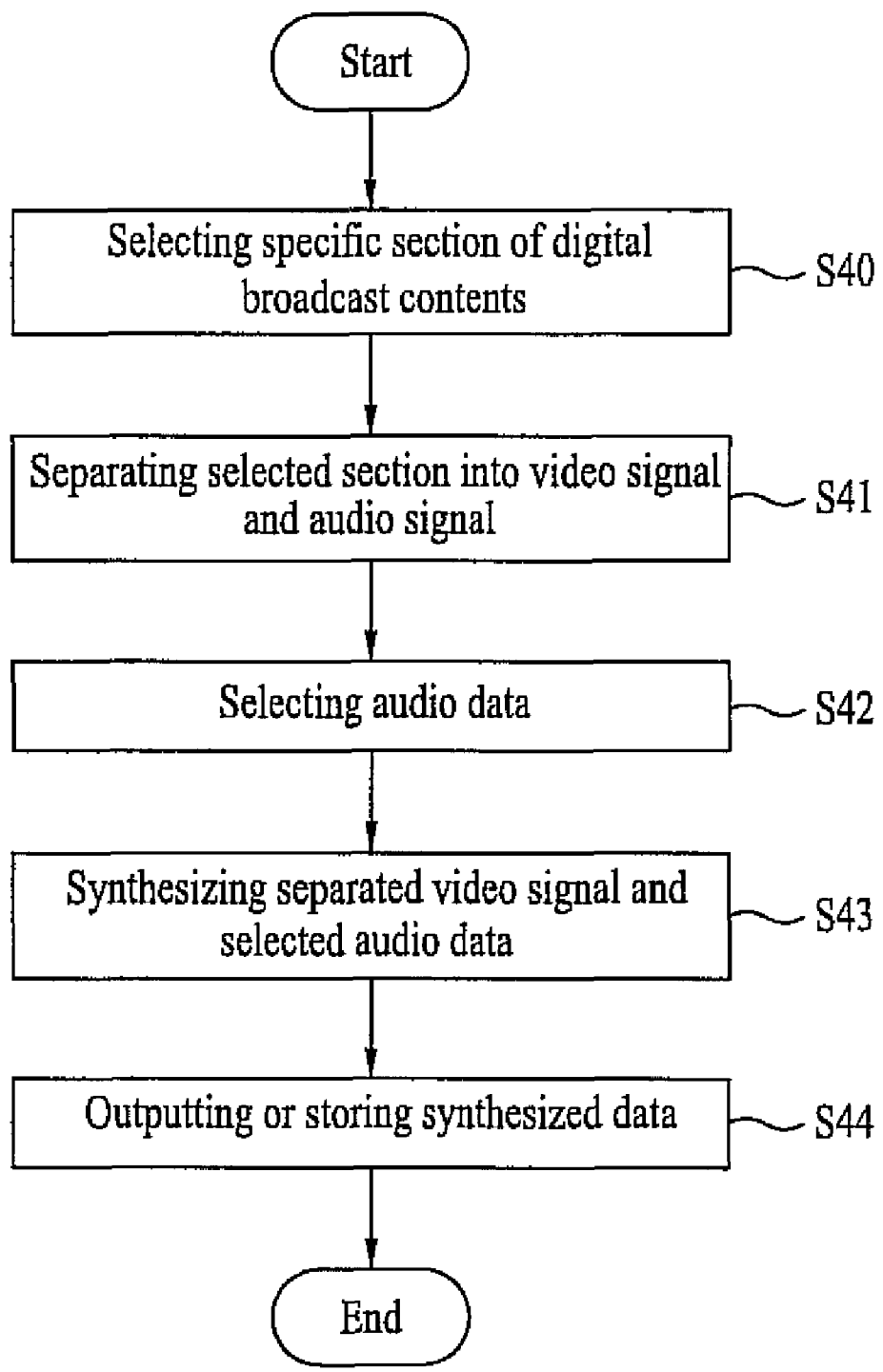
FIG. 4 is a flowchart of a method of converting digital broadcast contents according to one embodiment of the present invention.

FIG. 4 is a flowchart of a method of converting digital broadcast contents according to one embodiment of the present invention.

A method of converting digital broadcast contents according to one embodiment of the present invention is explained in detail with reference to FIG. 4 as follows.

Referring to FIG. 4, a specific section of a digital broadcast content received via a digital broadcast network is selected [S40]. The received digital broadcast content includes a video signal and an audio signal. As an example of the step S40, a user can designate a specific section to be converted according to the present invention by viewing the digital broadcast content after having played the digital broadcast content. The digital broadcast content may be received by real time via the digital broadcast network or recorded.

The selected section is separated into the video signal and the audio signal [S41].

At least one of at least one or more audio data stored in a memory provided to a digital broadcast terminal is selected [S42]. In the step S42, the selection of the audio data can be performed by a user or can be automatically achieved by the terminal.

Meanwhile, the at least one audio data should be editable. This is because a play time of the section selected in the step S40 may differ from a play time of the audio data. If the play time of the selected audio data is greater than that of the section selected in the step S40, a section amounting to the play time of the selected section is extracted from the selected audio data. Meanwhile, if the audio data selected in the step S42 is one and if the play time of the selected audio data is smaller than that of the section selected in the step S42, another audio data except the selected audio data can be further selected.

Subsequently, the video signal separated in the step S41 and the audio data selected in the step S42 are synthesized together [S43].

Finally, the data synthesized in the step S43 is outputted or stored [S44].

Figure 5:
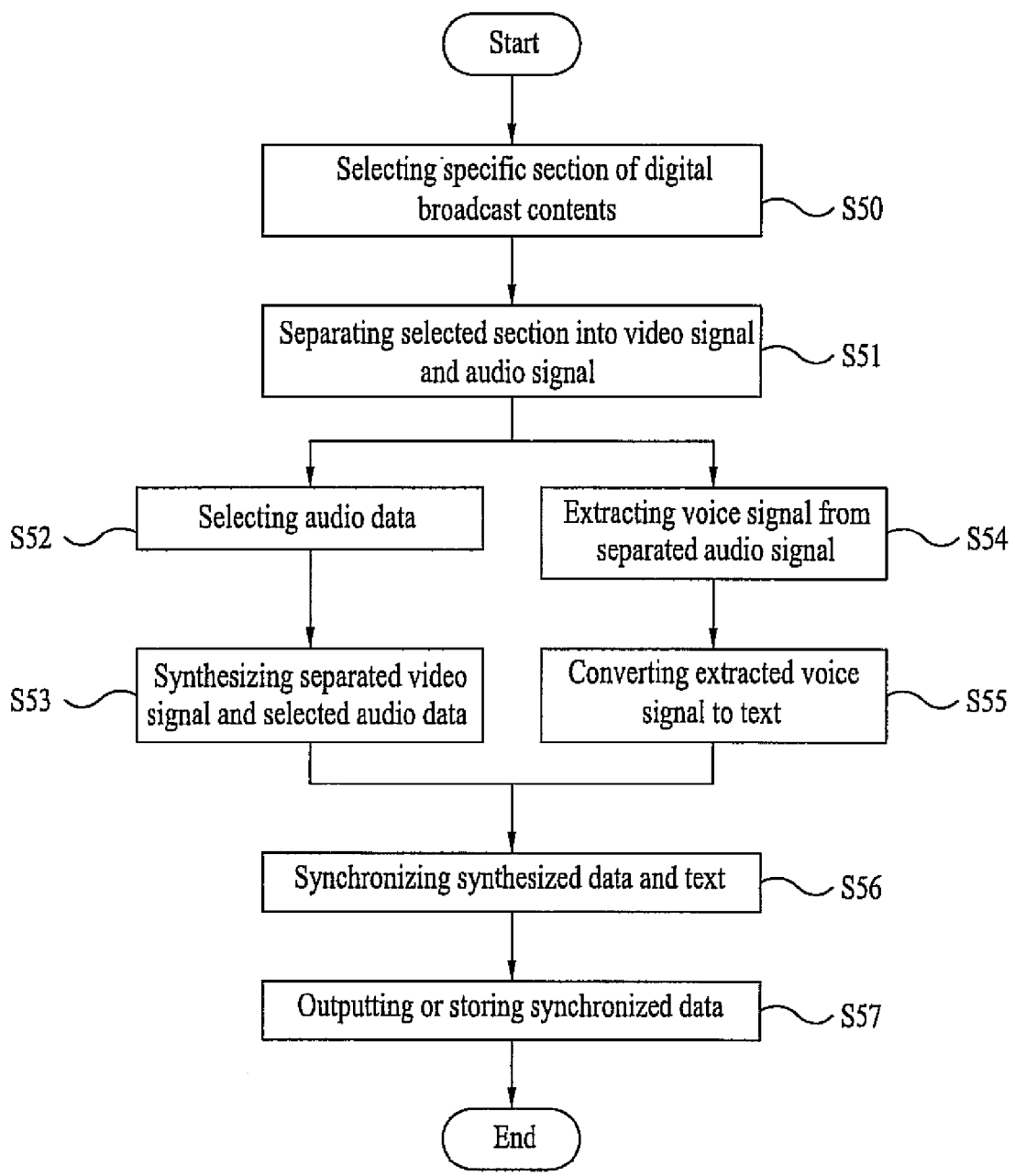
FIG. 5 is a flowchart of a method of converting digital broadcast contents according to another embodiment of the present invention.

FIG. 5 is a flowchart of a method of converting digital broadcast contents according to another embodiment of the present invention.

A method of converting digital broadcast contents according to another embodiment of the present invention is explained in detail with reference to FIG. 5 as follows.

Referring to FIG. 5, steps S50 to S53 are identical to the steps S40 to S43 shown in FIG. 4, respectively. The digital broadcast contents converting method shown in FIG. S differs from that shown in FIG. 4 in steps S54 to S56.

In particular, a voice signal is extracted from an audio signal separated in the step S51 [S54] and the extracted voice signal is then converted to a text [S55].

Subsequently, the data synthesized in the step SS3 and the text converted in the step S5 are synchronized together [S56].

Finally, the synchronized data is outputted or stored [S57].

FIG. 6 is a diagram of a screen for synthesizing a video signal and audio data of digital broadcast contents together according to the present invention.

Referring to FIG. 6, while a specific digital broadcast content is received or played, a section to be converted is selected via the input unit 12 of the digital broadcast terminal according to the present invention [S60]. In case of converting a recorded digital broadcast, a start menu 30 and a stop menu 31 are selected to select a section to be converted. Meanwhile, in case of converting a digital broadcast received by real time, the start menu 30 is selected to initiate a conversion according to the present invention. And, the conversion according to the present invention is ended if a corresponding reception is ended or the stop menu 31 is selected.

Subsequently, the terminal displays a message instructing a user to insert background music on the display unit 18 [S61]. In case that the user selects a viewing menu 32, the terminal displays a list of audio data stored in the memory 16 on the display unit 18 [S62]. If at least one of audio data of the displayed audio data list is selected according to the user's selection of a selection menu 33, the terminal displays an image, which indicates that the selected at least one audio data and the separated video signal are being synthesized, on the display unit 18 [s63]. In this case, the image may not be displayed while a digital broadcast is being received by real time.

Accordingly, the present invention provides the following effects or advantages.

First of all, an audio signal can be separated from a digital broadcast content that is recorded or received by real time and user-specific background music can be inserted.

Secondly, a voice is recognized from a separated audio signal. And, the recognized voice is converted to a text to be displayed on a screen.

Thirdly, digital broadcast contents recorded or received by real time can be edited in various ways to be reproduced as contents in a user-specific format.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of converting digital content in a mobile terminal, the method comprising:
    storing one or more audio data in a memory of the mobile terminal;
    storing at least one digital content including a video signal and an audio signal in the memory;
    playing a selected one of the at least one digital content, wherein the video signal of the selected digital content is displayed on a touch screen of the mobile terminal;
    displaying a menu on the touch screen enabling a selection of a start point in the selected digital content at which to begin conversion of the selected digital content and enabling a request for selecting at least one audio data of the one or more audio data stored in the memory;
    displaying a list of the one or more audio data on the touch screen;
    receiving a signal for selection, via the touch screen, of at least one audio data of the one or more audio data displayed on the list;
    synthesizing digital content by substituting the audio signal of the selected digital content with the selected at least one audio data and synthesizing the video signal of the selected digital content with the selected at least one audio data;
    playing the synthesized digital content; and
    storing the synthesized digital content in the memory.

2. The method of claim 1, wherein the at least one digital content is a digital broadcast content received via a digital broadcast network.

3. The method of claim 1, wherein the selected digital content is played based on a selection signal input received via the touch screen.

4. The method of claim 1, further comprising displaying a progress bar on the touch screen during synthesization of the video signal of the selected digital content with the selected at least one audio data, the progress bar having a first portion and a second portion.

5. The method of claim 4, wherein:
    the first portion of the progress bar indicates a portion of the video signal of the selected digital content and the selected at least one audio data already synthesized and the second portion of the progress bar indicates a remaining portion of the video signal of the selected digital content and the selected at least one audio data to be synthesized; and
    the first portion of the progress bar becomes bigger and the second portion of the progress bar becomes smaller during the synthesization.

6. A method of converting digital content in a mobile terminal, the method comprising:
    storing one or more audio data in a memory of the mobile terminal;
    storing at least one digital content including a video signal and an audio signal in the memory;
    playing a selected one of the at least one digital content, wherein the video signal of the selected digital content is displayed on a touch screen of the mobile terminal;
    displaying a menu on the touch screen enabling a selection of a specific section of the selected digital content to be converted and enabling a request for selecting at least one audio data of the one or more audio data stored in the memory;

displaying a list of the one or more audio data on the touch screen;

receiving a signal for selection, via the touch screen, of at least one audio data of the one or more audio data displayed on the list;

synthesizing digital content by substituting the audio signal of the selected section of the selected digital content with the selected at least one audio data and synthesizing the video signal of the selected section of the selected digital content with the selected at least one audio data;

playing the synthesized digital content; and storing the synthesized digital content in the memory.

7. The method of claim 6, wherein selection of the specific section of the selected digital content comprises receiving a selection of a start point of the specific section of the selected digital content.

8. A method of converting digital content in a mobile terminal, the method comprising:

storing one or more audio data in a memory of the mobile terminal;

storing at least one digital content including a video signal and an audio signal in the memory;

receiving a signal, via a touch screen of the mobile terminal, for selection of one of the at least one digital content stored in the memory to be converted;

playing the selected digital content, wherein the video signal of the selected digital content is displayed on the touch screen;

displaying a menu on the touch screen enabling a selection of a start point of a specific section of the selected digital content to be converted and enabling a request for selecting at least one audio data of the one or more audio data stored in the memory;

displaying a list of the one or more audio data on the touch screen;

receiving a signal for selection, via the touch screen, of at least one audio data of the one or more audio data displayed on the list;

synthesizing digital content by substituting the audio signal of the selected digital content with the selected at least one audio data and synthesizing the video signal of the selected digital content with the selected at least one audio data;

playing the synthesized digital content; and receiving a signal, via the touch screen, for selecting an end point of the specific section of the selected digital content to be converted.

9. The method of claim 8, wherein the at least one digital content is a digital broadcast content received via a digital broadcast network.

10. The method of claim 8, further comprising storing the synthesized digital content in the memory.

11. A method of converting digital content in a mobile terminal, the method comprising:

storing one or more audio data in a memory of the mobile terminal;

storing at least one digital content including a video signal and an audio signal in the memory;

receiving a signal, via a touch screen of the mobile terminal, for selection of one of the at least one digital content stored in the memory to be converted;

playing the selected digital content, wherein the video signal of the selected digital content is displayed on the touch screen;

displaying a menu on the touch screen enabling a selection of a start point of a specific section of the selected digital content to be converted and enabling a request for selecting at least one audio data of the one or more audio data stored in the memory;

displaying a list of the one or more audio data on the touch screen;

receiving a signal for selection, via the touch screen, of at least one audio data of the one or more audio data displayed on the list;

receiving a signal, via the touch screen, for selecting an end point of the specific section of the selected digital content to be converted;

synthesizing digital content by substituting the audio signal of the specific section of the selected digital content with the selected at least one audio data and synthesizing the video signal of the specific section of the selected digital content with the selected at least one audio data; and storing the synthesized digital content in the memory, wherein a portion of the selected at least one audio data of equal length to a play time of the specific section of the selected digital content is extracted from the selected at least one audio data to be synthesized with the specific section of the selected digital content when a play time of the selected at least one audio data is greater than the play time of the specific section of the selected digital content, and wherein the extracted portion of the selected at least one audio data can be selected via the touch screen.

12. A mobile terminal, comprising:

a memory configured for storing one or more audio data and at least one digital content, the at least one digital content including a video signal and an audio signal;

a touch screen configured for:

displaying the video signal of a selected one of the at least one digital content when the selected digital content is played;

displaying a menu enabling a selection of a start point in the selected digital content at which to begin conversion of the selected digital content and enabling a request for selecting at least one audio data of the one or more audio data stored in the memory;

displaying a list of the one or more audio data; and receiving a signal for selection of at least one audio data of the one or more audio data displayed on the list; and a processor configured for:

synthesizing digital content by substituting the audio signal of the selected digital content with the selected at least one audio data and synthesizing the video signal of the selected digital content with the selected at least one audio data;

playing the synthesized digital content; and storing the synthesized digital content in the memory.

13. The mobile terminal of claim 12, wherein the touch screen is further configured for receiving a selection signal for playing the selected digital content.

14. The mobile terminal of claim 12, wherein the touch screen is further configured for displaying a progress bar during synthesization of the video signal of the selected digital content with the selected at least one audio data, wherein the progress bar includes a first portion and a second portion.

15. The mobile terminal of claim 14, wherein:

the first portion of the progress bar indicates a portion of the video signal of the selected digital content and the selected at least one audio data already synthesized and the second portion of the progress bar indicates a remaining portion of the video signal of the selected digital content and the selected at least one audio data to be synthesized; and the first portion of the progress bar becomes bigger and the second portion of the progress bar becomes smaller during the synthesization.

16. A mobile terminal, comprising:

a memory configured for storing one or more audio data and at least one digital content, the digital content including a video signal and an audio signal;

a touch screen configured for:
- receiving a signal for selecting one of the at least one digital content stored in the memory to be converted;
- displaying the video signal of the selected digital content when the selected digital content is played;
- displaying a menu enabling a selection of a start point of a specific section of the selected digital content to be converted and enabling a request for selecting at least one audio data of the one or more audio stored in the memory;
- displaying a list of the one or more audio data;
- receiving a signal for selecting at least one audio data of the one or more audio data displayed on the list; and
- receiving a signal for selecting an end point of the specific section of the selected digital content to be converted; and a processor configured for:
- synthesizing digital content by substituting the audio signal of the selected digital content with the selected at least one audio data and synthesizing the video signal of the selected digital content with the selected at least one audio data; and
- playing the synthesized digital content.

17. The mobile terminal of claim 16, further comprising a digital broadcast receiving unit, wherein the at least one digital content is a digital broadcast content received via the digital broadcast receiving unit.

18. The mobile terminal of claim 16, wherein the memory is further configured for storing the synthesized digital content.

* * * * *